(12) United States Patent
Sugahara et al.

(10) Patent No.: US 12,280,358 B2
(45) Date of Patent: Apr. 22, 2025

(54) ORGANIC MATERIAL DECOMPOSITION CATALYST AND ORGANIC MATERIAL DECOMPOSITION APPARATUS

(71) Applicant: Murata Manufacturing Co., Ltd., Nagaokakyo (JP)

(72) Inventors: Nario Sugahara, Nagaokakyo (JP); Kentaro Ishihara, Nagaokakyo (JP); Hideto Sato, Nagaokakyo (JP)

(73) Assignee: MURATA MANUFACTURING CO., LTD., Nagaokakyo (JP)

( * ) Notice: Subject to any disclaimer, the term of this patent is extended or adjusted under 35 U.S.C. 154(b) by 725 days.

(21) Appl. No.: 17/538,016

(22) Filed: Nov. 30, 2021

(65) Prior Publication Data

US 2022/0080391 A1 Mar. 17, 2022

Related U.S. Application Data

(63) Continuation of application No. PCT/JP2020/016243, filed on Apr. 13, 2020.

(30) Foreign Application Priority Data

Jun. 6, 2019 (JP) ................. 2019-106131

(51) Int. Cl.
| | | |
|---|---|---|
| B01J 23/02 | (2006.01) | |
| B01D 53/86 | (2006.01) | |
| B01D 53/94 | (2006.01) | |
| B01J 23/00 | (2006.01) | |
| B01J 35/61 | (2024.01) | |

(52) U.S. Cl.
CPC ............ B01J 23/02 (2013.01); B01D 53/864 (2013.01); B01D 53/94 (2013.01); B01J 23/002 (2013.01);
(Continued)

(58) Field of Classification Search
CPC ........ B01J 23/02; B01J 35/613; B01J 35/612; B01J 23/002; B01D 53/864; B01D 53/94;
(Continued)

(56) References Cited

U.S. PATENT DOCUMENTS

4,522,706 A * 6/1985 Wheelock ............... C10B 55/02
208/213
4,636,378 A * 1/1987 Pastor .................. C01G 23/003
423/608
(Continued)

FOREIGN PATENT DOCUMENTS

| EP | 3603799 A1 | 2/2020 |
|---|---|---|
| EP | 3769839 A1 | 1/2021 |

(Continued)

OTHER PUBLICATIONS

Fatma Temmar et al., "Calculations of the Structural, Elastic, Magnetic, and Electronic Properties of the New Compound BaZr0.5Mn0.5O3 with Tetragonal Structure." Journal of Superconductivity and Novel Magnetism, 31, pp. 3339-3346 (Year: 2018).*
(Continued)

*Primary Examiner* — Patricia L. Hailey
(74) *Attorney, Agent, or Firm* — ArentFox Schiff LLP

(57) ABSTRACT

An organic material decomposition catalyst that contains $BaCO_3$ and a perovskite composite oxide represented by $A_xB_yM_zO_w$, wherein A contains Ba, B contains Zr, and M denotes Mn. A peak intensity $I(BaCO_3(111))$ of $BaCO_3(111)$ of the $BaCO_3$ and a peak intensity $I(BaZrO_3(110))$ of a perovskite composite oxide $A_xB_yM_zO_w(110)$ of the perovskite composite oxide represented by $A_xB_yM_zO_w$, each determined by X-ray diffractometry of the organic material decomposition catalyst, have a ratio $I(BaCO_3(111))/I(BaZrO_3(110))$ in a range of 0.022 to 0.052. In another aspect, in the perovskite composite oxide represented by $A_xB_yM_zO_w$, $1.01 \leq x \leq 1.06$, $0.1 \leq z \leq 0.125$, and $y+z=1$ are sat-
(Continued)

isfied, w denotes a positive value that satisfies electroneutrality, and the organic material decomposition catalyst has a specific surface area in the range of 12.3 to 16.9 m$^2$/g.

10 Claims, 3 Drawing Sheets

(52) U.S. Cl.
CPC .......... *B01J 35/612* (2024.01); *B01J 35/613* (2024.01); *B01D 2255/2042* (2013.01); *B01D 2255/20715* (2013.01); *B01D 2255/2073* (2013.01); *B01D 2255/402* (2013.01); *B01D 2255/9207* (2013.01)

(58) Field of Classification Search
CPC .. B01D 2255/2042; B01D 2255/20715; B01D 2255/2073; B01D 2255/402; B01D 2255/9207; C01P 2002/74; C01P 2002/70
USPC .................................. 502/174, 340, 349, 525
See application file for complete search history.

(56) References Cited

U.S. PATENT DOCUMENTS

| | | | | |
|---|---|---|---|---|
| 6,350,421 | B1 * | 2/2002 | Strehlau | F01N 3/0807 502/514 |
| 11,383,226 | B2 * | 7/2022 | Ishihara | B01J 35/633 |
| 11,529,613 | B2 * | 12/2022 | Sugahara | B01D 53/865 |
| 11,642,661 | B2 * | 5/2023 | Kuretake | B01J 21/066 502/328 |
| 11,648,537 | B2 * | 5/2023 | Kuretake | B01J 35/657 502/324 |
| 2014/0170088 | A1 | 6/2014 | Kale et al. | |
| 2022/0105497 | A1 * | 4/2022 | Sugahara | B01J 35/613 |
| 2022/0297090 | A1 * | 9/2022 | Sato | B01J 23/58 |

FOREIGN PATENT DOCUMENTS

| | | | | |
|---|---|---|---|---|
| JP | 3800651 | B2 * | 7/2006 | ............. C01B 13/14 |
| JP | 2015229137 | A * | 12/2015 | ............. B01D 53/86 |
| WO | 2019215951 | A1 | 11/2019 | |

OTHER PUBLICATIONS

A. S. Verma et al., "Lattice constant of cubic perovskites." Journal of Alloys and Compounds 485, pp. 514-518. (Year: 2009).*
Katia Gallucci et al., "Catalytic combustion of methane on BaZr(1-x)MexO3 perovskites synthesised by a modified citrate method." Catalysis Today 197, pp. 236-242. (Year: 2012).*
Written Opinion of the International Searching Authority issued for PCT/JP2020/016243, date of mailing Jun. 16, 2020.
International Search Report issued for PCT/JP2020/016243, date of mailing Jun. 16, 2020.

* cited by examiner

ORGANIC MATERIAL DECOMPOSITION CATALYST AND ORGANIC MATERIAL DECOMPOSITION APPARATUS

CROSS REFERENCE TO RELATED APPLICATIONS

The present application is a continuation of International application No. PCT/JP2020/016243, filed Apr. 13, 2020, which claims priority to Japanese Patent Application No. 2019-106131, filed Jun. 6, 2019, the entire contents of each of which are incorporated herein by reference.

FIELD OF THE INVENTION

The present invention relates to an organic material decomposition catalyst used to decompose an organic material and an organic material decomposition apparatus including the organic material decomposition catalyst.

BACKGROUND OF THE INVENTION

It has been known that organic material decomposition catalysts are used to decompose organic materials.

Patent Document 1 (Japanese Patent No. 6303834) discloses an organic material decomposition catalyst containing a perovskite composite oxide represented by the general formula $ABO_3$, wherein the site A contains Ba, the site B contains Zr, and the Zr is partly substituted with at least one of Mn, Co, and Ni. This organic material decomposition catalyst does not contain expensive noble metals and is said to have high activity and heat resistance.

SUMMARY OF THE INVENTION

Although the organic material decomposition catalyst described in Patent Document 1 has high activity, there is yet room for further improvement in activity.

The present invention aims to address such an issue and provide an organic material decomposition catalyst with further improved activity and an organic material decomposition apparatus including such an organic material decomposition catalyst.

An organic material decomposition catalyst according to an aspect of the present invention is an organic material decomposition catalyst used to decompose an organic material, which contains $BaCO_3$ and a perovskite composite oxide represented by $A_xB_yM_zO_w$, wherein A contains Ba, B contains Zr, and M denotes Mn, wherein a peak intensity $I(BaCO_3(111))$ of $BaCO_3(111)$ of the $BaCO_3$ and a peak intensity $I(BaZrO_3(110))$ of a perovskite composite oxide $A_xB_yM_zO_w(110)$ of the perovskite composite oxide represented by $A_xB_yM_zO_w$, each determined by X-ray diffractometry of the organic material decomposition catalyst, have a ratio $I(BaCO_3(111))/I(BaZrO_3(110))$ in a range of 0.022 to 0.052.

The organic material decomposition catalyst may have a specific surface area in a range of 12.3 to 16.9 $m^2/g$.

The ratio $(BaCO_3(111))/I(BaZrO_3(110))$ of the peak intensity $I(BaCO_3(111))$ to the peak intensity $I(BaZrO_3(110))$ may range from 0.022 to 0.041.

The organic material decomposition catalyst may have a specific surface area in the range of 12.3 to 13.5 $m^2/g$.

An organic material decomposition catalyst according to a further aspect of the present invention is an organic material decomposition catalyst used to decompose an organic material, which contains $BaCO_3$ and a perovskite composite oxide represented by $A_xB_yM_zO_w$, wherein A contains Ba, B contains Zr, M denotes Mn, $1.01 \leq x \leq 1.06$, $0.1 \leq z \leq 0.125$, $y+z=1$, and w denotes a positive value that satisfies electroneutrality, and the organic material decomposition catalyst has a specific surface area in a range of 12.3 to 16.9 $m^2/g$.

The organic material decomposition catalyst may have a specific surface area in the range of 12.3 to 13.5 $m^2/g$.

An organic material decomposition apparatus according to the present invention includes one of the organic material decomposition catalysts described above.

An organic material decomposition catalyst according to the present invention can have further improved activity.

Furthermore, an organic material decomposition apparatus according to the present invention includes an organic material decomposition catalyst with further improved activity and can therefore decompose an organic material at a higher decomposition rate.

DETAILED DESCRIPTION OF THE PREFERRED EMBODIMENTS

Figure 1:
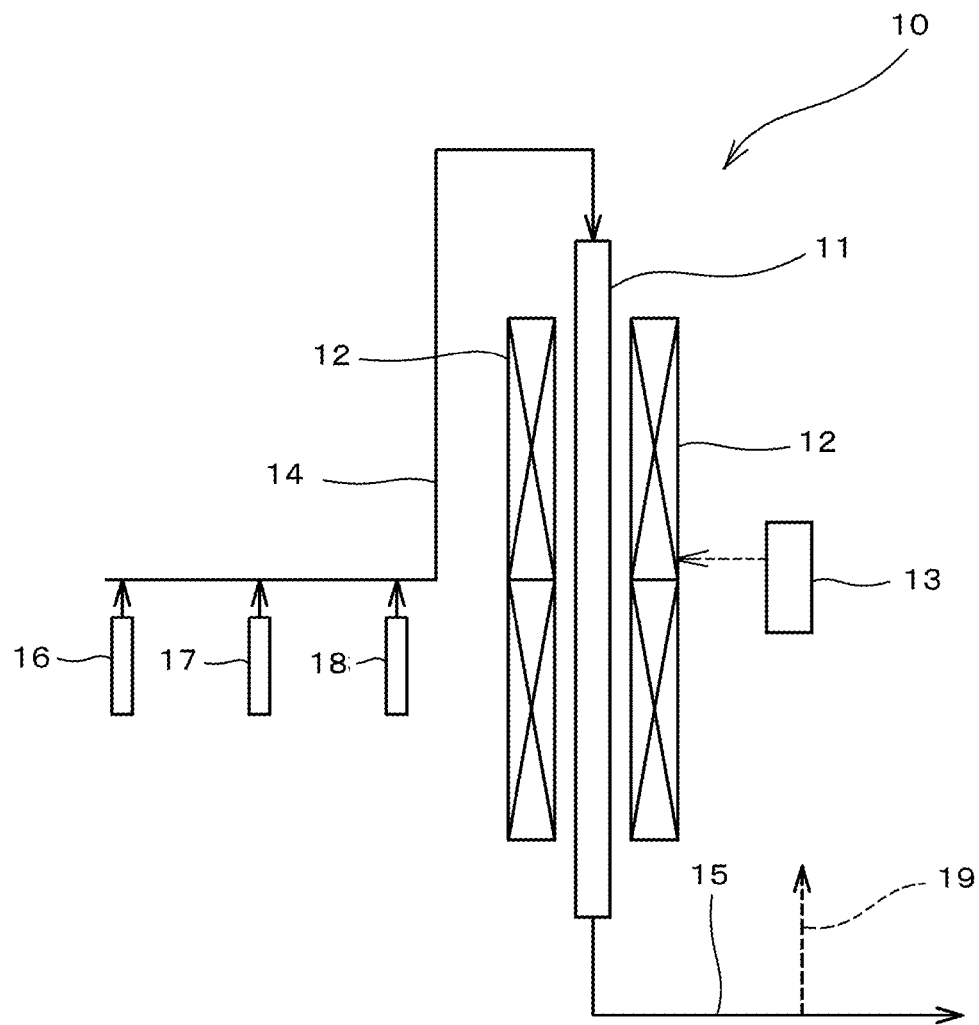
FIG. 1 is a schematic view of a test apparatus used in a test for evaluating the organic material decomposition performance of an organic material decomposition catalyst.

The features of the present invention are specifically described in the following embodiments of the present invention.

An organic material decomposition catalyst according to the present invention is a catalyst used to decompose an organic material and satisfies at least one of the following first requirement (hereinafter referred to as a first requirement of the present invention) and the following second requirement (hereinafter referred to as a second requirement of the present invention).

The first requirement of the present invention is that an organic material decomposition catalyst contains $BaCO_3$ and a perovskite composite oxide represented by the general formula $A_xB_yM_zO_w$, wherein A contains Ba, B contains Zr, M denotes Mn, and the peak intensity $I(BaCO_3(111))$ of $BaCO_3(111)$ and the peak intensity $I(BaZrO_3(110))$ of a perovskite composite oxide $A_xB_yM_zO_w(110)$ each determined by the X-ray diffractometry of the organic material decomposition catalyst have a ratio $I(BaCO_3(111))/I(BaZrO_3(110))$ in the range of 0.022 to 0.052. B and M in the general formula $A_xB_yM_zO_w$ occupy a crystallographically equivalent position and can be represented by $A_x(B_yM_z)O_w$.

The $BaCO_3(111)$ refers to a (111) plane of $BaCO_3$, and the perovskite composite oxide $A_xB_yM_zO_w(110)$ refers to a (110) plane of the perovskite composite oxide $A_xB_yM_zO_w$. The peak intensity refers to the maximum value of the target peak.

The second requirement of the present invention is that the organic material decomposition catalyst contains $BaCO_3$ and a perovskite composite oxide represented by the general formula $A_xB_yM_zO_w$, wherein A contains Ba, B contains Zr, M denotes Mn, x, y, and z satisfy $1.01 \leq x \leq 1.06, 0.1 \leq z \leq 0.125$, and $y+z=1$, and w denotes a positive value that satisfies electroneutrality, and the organic material decomposition catalyst has a specific surface area in the range of 12.3 to 16.9 $m^2/g$.

As described later, an organic material decomposition catalyst that satisfies at least one of the first and second requirements of the present invention has high activity and can have a higher organic material decomposition rate than known organic material decomposition catalysts. This organic material decomposition catalyst can be used for various applications to decompose organic materials, such as purification of exhaust gases from factories and automobiles. In such a case, an organic material decomposition apparatus can be configured with an organic material decomposition catalyst that satisfies at least one of the first and second requirements of the present invention.

Examples

High-purity $BaCO_3$, $ZrO_2$, and $MnCO_3$ powders were weighed so as to have the composition shown in Table 1. Pure water was added to the powders. The powders were wet-blended together with $ZrO_2$ cobblestones to prepare a slurry. The slurry was dried with a dryer at 120° C. The resulting raw mixed powder was heat-treated in the predetermined temperature range of 1100° C. to 1150° C. for 2 hours. Thus, a desired perovskite composite oxide was prepared.

Subsequently, an organic binder and pure water were added to the perovskite composite oxide, and the mixture was wet-blended together with $ZrO_2$ cobblestones to prepare slurry. The slurry was dried with a dryer at 120° C., was ground into a powder, and was then formed with a pressing machine into cylindrical pellets 8.5 mm in diameter and 8 mm in thickness. The pellets were fired in the predetermined temperature range of 990° C. to 1100° C. for 2 hours, were ground in a mortar, and were classified. Thus, organic material decomposition catalysts of sample Nos. 1 to 10 listed in Table 1 were prepared. The organic material decomposition catalysts have a diameter in the range of 0.5 to 0.6 mm and have a particulate shape.

In Table 1, the samples of sample Nos. 1 to 7 without * are samples that satisfy the first and second requirements of the present invention. On the other hand, the samples of sample Nos. 8 to 10 with * are samples that do not satisfy the first and second requirements of the present invention.

<Activity Evaluation Method>

(1) Test Apparatus

FIG. 1 is a schematic view of a test apparatus 10 used in a test for evaluating the organic material decomposition performance of an organic material decomposition catalyst. The test apparatus 10 includes a reactor 11 through which an organic material flows, a heater 12 for heating the organic material flowing through the reactor 11, and a controller 13 for controlling the heater 12.

A sample (organic material decomposition catalyst) produced by the above method is placed in a central region of the reactor 11 to be heated with the heater 12. The controller 13 is configured to control the temperature of the region heated with the heater 12.

A gas supply pipe 14 is coupled upstream to the reactor 11. The gas supply pipe 14 is coupled to a toluene supply line 16 for supplying toluene (an organic material), a nitrogen supply line 17 for supplying nitrogen ($N_2$), and an oxygen supply line 18 for supplying oxygen ($O_2$). Thus, a gas to be treated containing toluene, nitrogen, and oxygen is supplied to the reactor 11 through the gas supply pipe 14.

A gas discharge pipe 15 for discharging treated gas from the system after the decomposition of the organic material is coupled downstream to the reactor 11. The gas discharge pipe 15 is coupled to a sampling line 19 for sampling the treated gas and is configured to analyze the concentration of toluene in the treated gas with a gas chromatograph.

(2) Test Method

The test apparatus 10 was used in a test in which a gas to be treated containing toluene, nitrogen, and oxygen was continuously supplied to the reactor 11 to decompose toluene. The composition of the gas to be treated was toluene ($C_7H_8$): 50 ppm, nitrogen ($N_2$): 80%, and oxygen ($O_2$) 20% by volume, the space velocity SV during measurement was 150,000/h, and the catalyst temperature was 300° C.

The treated gas was sampled at the outlet of the sampling line 19 to determine the toluene concentration by gas chromatography. The toluene decomposition rate was determined using the formula (1). "50" in the formula (1) is the concentration of toluene in the gas to be treated before the treatment.

$$\text{Toluene decomposition rate (\%)} = 100 - 100 \times (\text{toluene concentration}/50) \qquad (1)$$

TABLE 1

| Sample No. | Charge composition | | | Heat-treatment temperature of raw mixed powder (° C.) | Firing temperature (° C.) | Toluene decomposition rate (%) | I (BaCO₃)/ I (BaZrO₃) | Specific surface area (m²/g) |
|---|---|---|---|---|---|---|---|---|
| | x | y | z | | | | | |
| 1 | 1.01 | 0.9 | 0.1 | 1100 | 990 | 94.8 | 0.022 | 12.3 |
| 2 | 1.03 | 0.875 | 0.125 | 1100 | 1050 | 94.5 | 0.041 | 13.5 |
| 3 | 1.05 | 0.89 | 0.11 | 1150 | 1050 | 93.9 | 0.049 | 15.2 |
| 4 | 1.02 | 0.9 | 0.1 | 1150 | 1050 | 96.0 | 0.030 | 13.1 |
| 5 | 1.02 | 0.9 | 0.1 | 1120 | 1050 | 94.8 | 0.035 | 13.2 |
| 6 | 1.04 | 0.9 | 0.1 | 1120 | 1050 | 93.3 | 0.044 | 14.1 |
| 7 | 1.06 | 0.9 | 0.1 | 1120 | 1050 | 92.2 | 0.052 | 16.9 |
| 8* | 1.00 | 0.9 | 0.1 | 1100 | 1100 | 91.8 | 0.020 | 10.5 |
| 9* | 0.97 | 0.9 | 0.1 | 1100 | 1050 | 89.5 | 0.019 | 7.3 |
| 10* | 1.07 | 0.9 | 0.1 | 1100 | 1050 | 84.6 | 0.060 | 17.1 |

<Measurement of Peak Intensity by X-Ray Diffraction>

The organic material decomposition catalyst of each of the sample Nos. 1 to 10 in Table 1 was finely ground in a mortar and was subjected to X-ray diffractometry using an X-ray diffractometer "D8 ADVANCE" manufactured by BRUKER. The measurement was performed in the range of 2θ=20 to 85 degrees at intervals of 0.0195 degrees, wherein θ denotes the angle of X-ray incident on the sample. From the measurement results, the peak intensity $I(BaCO_3(111))$ of $BaCO_3(111)$ and the peak intensity $I(BaZrO_3(110))$ of the perovskite composite oxide $A_xB_yM_zO_w(110)$ $(BaZrO_3(110))$ were determined.

Figure 2:
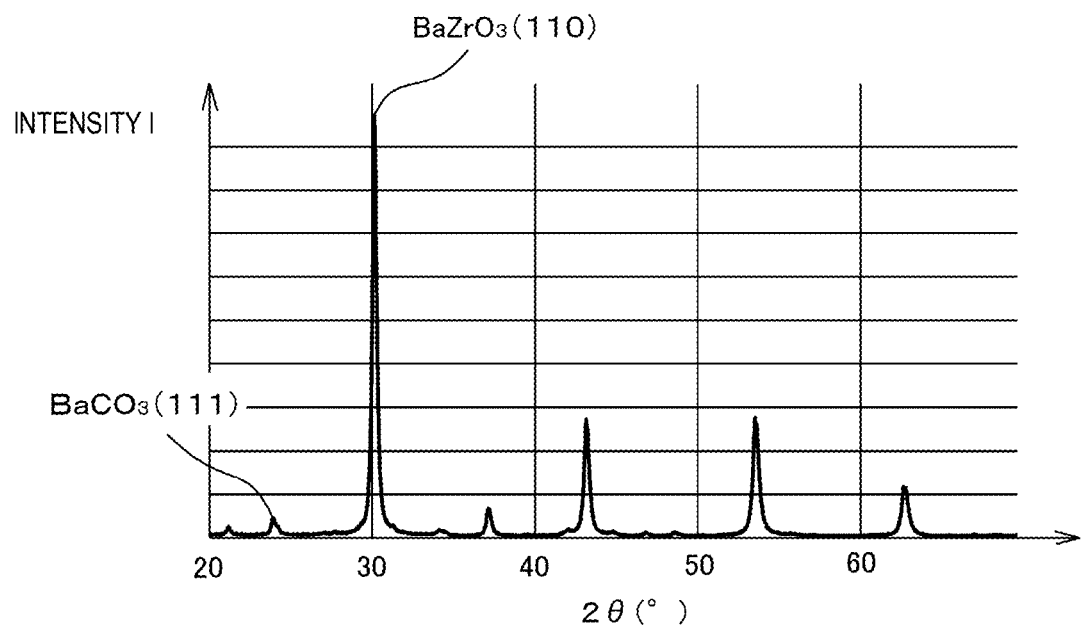
FIG. 2 is an X-ray diffraction pattern obtained by the X-ray diffractometry of an organic material decomposition catalyst.

FIG. 2 is an X-ray diffraction pattern obtained by the X-ray diffractometry of an organic material decomposition catalyst. As shown in FIG. 2, $I(BaCO_3(111))$ was observed in the diffraction angle 2θ range of 20 degrees<2θ<30 degrees, and $I(BaZrO_3(110))$ was observed in the diffraction angle 2θ range of 25 degrees<2θ<35 degrees.

The peak intensity ratio $I(BaCO_3(111))/I(BaZrO_3(110))$ was determined from the $I(BaCO_3(111))$ and $I(BaZrO_3(110))$.

The amount of $BaCO_3$ in the organic material decomposition catalyst can be determined from the peak intensity ratio $I(BaCO_3(111))/I(BaZrO_3(110))$. It is difficult to directly measure the amount of $BaCO_3$ in the organic material decomposition catalyst, and the $BaCO_3$ content is therefore determined by measuring the peak intensity ratio $I(BaCO_3(111))/I(BaZrO_3(110))$.

<Measurement of Specific Surface Area>

The specific surface area (SSA) of an organic material decomposition catalyst prepared was measured with a specific surface area measuring apparatus "Macsorb model-1201" manufactured by Mountech Co., Ltd. For the measurement of the specific surface area, the degassing conditions included 400° C. for 20 minutes.

Table 1 shows the catalyst composition, the heat-treatment temperature of the raw mixed powder, the firing temperature, the toluene decomposition rate, the peak intensity ratio $I(BaCO_3(111))/I(BaZrO_3(110))$, and the specific surface area. The peak intensity ratio $I(BaCO_3(111))/I(BaZrO_3(110))$ is a numerical value rounded to the third decimal place.

Figure 3:
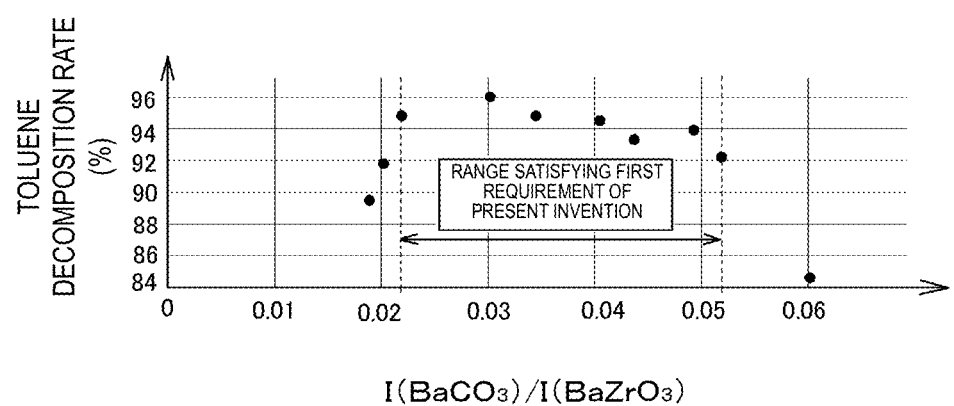
FIG. 3 is a graph showing the relationship between the peak intensity ratio $I(BaCO_3(111))/I(BaZrO_3(110))$ and the toluene decomposition rate in organic material decomposition catalysts of sample Nos. 1 to 10.

FIG. 3 is a graph showing the relationship between the peak intensity ratio $I(BaCO_3(111))/I(BaZrO_3(110))$ and the toluene decomposition rate in the organic material decomposition catalysts of sample Nos. 1 to 10 listed in Table 1. The "RANGE SATISFYING FIRST REQUIREMENT OF PRESENT INVENTION" in FIG. 3 is a range in which the peak intensity ratio $I(BaCO_3(111))/I(BaZrO_3(110))$ ranges from 0.022 to 0.052.

As shown in Table 1 and FIG. 3, the organic material decomposition catalysts of sample Nos. 8 to 10 with a peak intensity ratio $I(BaCO_3(111))/I(BaZrO_3(110))$ of less than 0.022 or more than 0.052 and not satisfying the first requirement of the present invention had a toluene decomposition rate of less than 92%.

In contrast, the organic material decomposition catalysts of sample Nos. 1 to 7 satisfying the first requirement of the present invention had a toluene decomposition rate of 92% or more. Thus, the organic material decomposition catalysts with a peak intensity ratio $I(BaCO_3(111))/I(BaZrO_3(110))$ in the range of 0.022 to 0.052 and with a $BaCO_3$ content in a predetermined range have a toluene decomposition rate of 92% or more and have higher activity than the organic material decomposition catalysts with a $BaCO_3$ content outside the predetermined range.

As described above, the organic material decomposition catalysts of sample Nos. 1 to 7 also satisfy the second requirement of the present invention. Thus, the organic material decomposition catalysts satisfying the second requirement of the present invention have a toluene decomposition rate of 92% or more and have high activity.

It should be noted that although the organic material decomposition catalysts of sample Nos. 1 to 7 satisfy the first and second requirements of the present invention, satisfying at least one of the requirements improves activity.

Figure 4:
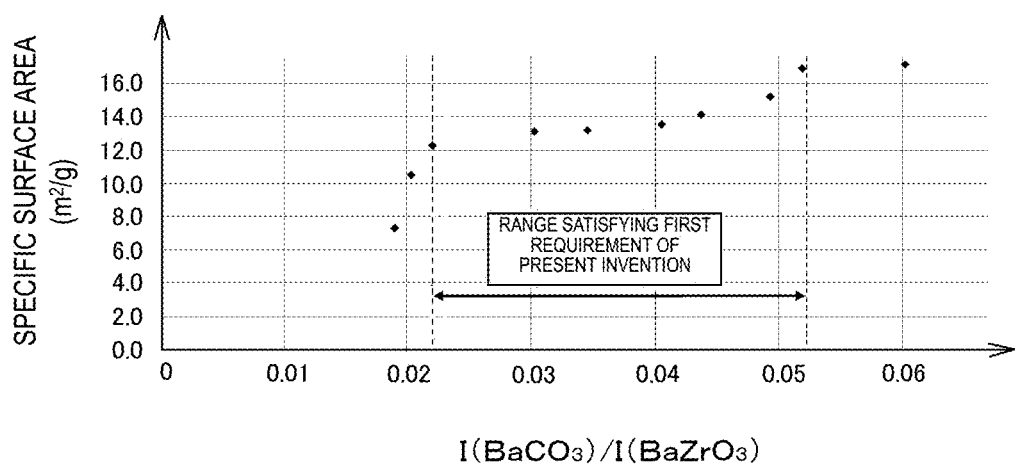
FIG. 4 is a graph showing the relationship between the peak intensity ratio $I(BaCO_3(111))/I(BaZrO_3(110))$ and the specific surface area in the organic material decomposition catalysts of sample Nos. 1 to 10.

FIG. 4 is a graph showing the relationship between the peak intensity ratio $I(BaCO_3(111))/I(BaZrO_3(110))$ and the specific surface area in the organic material decomposition catalysts of sample Nos. 1 to 10. A smaller peak intensity ratio $I(BaCO_3(111))/I(BaZrO_3(110))$, that is, a lower $BaCO_3$ content results in a smaller specific surface area. As shown in FIG. 4, a peak intensity ratio $I(BaCO_3(111))/I(BaZrO_3(110))$ of less than 0.022 results in a drastically decreased specific surface area and consequently lower catalytic activity.

On the other hand, a peak intensity ratio $I(BaCO_3(111))/I(BaZrO_3(110))$ of more than 0.052 and an increased $BaCO_3$ content result in a decreased amount of $Ba(ZrMn)O_3$ due to the production of $BaCO_3$, result in the formation of a different phase, and result in lower crystallinity, thus resulting in a catalyst with lower activity.

In contrast, a peak intensity ratio $I(BaCO_3(111))/I(BaZrO_3(110))$ within the range satisfying the first requirement of the present invention, that is, in the range of 0.022 to 0.052 and a $BaCO_3$ content within the predetermined range results in the formation of a smaller amount of different phase and a stably maintained crystal phase of $Ba(ZrMn)O_3$, thus resulting in high activity.

As shown in Table 1, the organic material decomposition catalysts of sample Nos. 1 to 7 with a peak intensity ratio $I(BaCO_3(111))/I(BaZrO_3(110))$ in the range of 0.022 to 0.052 have a specific surface area in the range of 12.3 to 16.9 m²/g.

Figure 5:
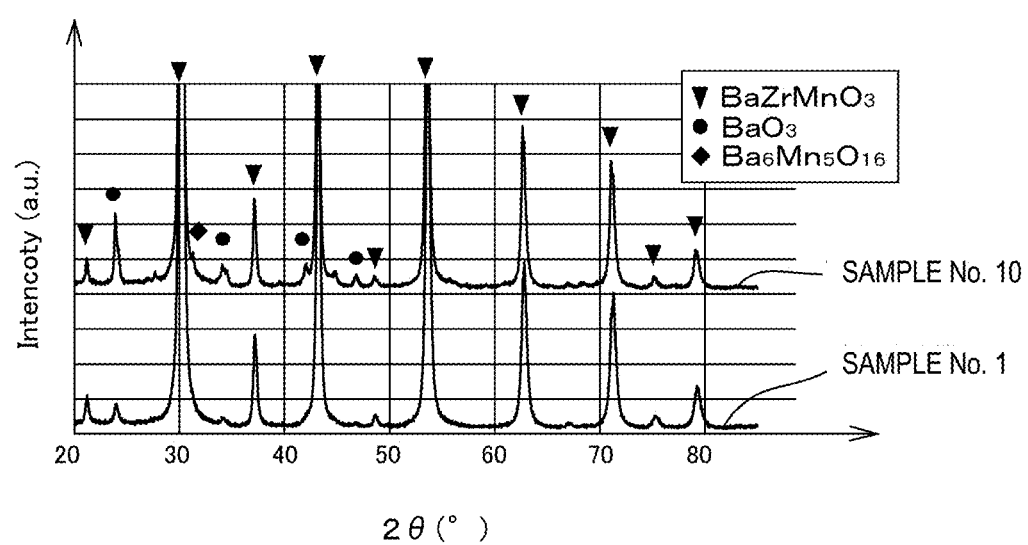
FIG. 5 is a graph showing X-ray diffraction patterns of the organic material decomposition catalyst of sample No. 1 and the organic material decomposition catalyst of sample No. 10 obtained by X-ray diffractometry.

FIG. 5 is a graph showing X-ray diffraction patterns of the organic material decomposition catalyst of sample No. 1 and the organic material decomposition catalyst of sample No. 10 in Table 1 obtained by X-ray diffractometry. FIG. 5 shows that the organic material decomposition catalyst of sample No. 10 with a peak intensity ratio $I(BaCO_3(111))/I(BaZrO_3(110))$ of more than 0.052 and with a high $BaCO_3$ content formed a different phase, such as $Ba_6Mn_5O_{16}$.

In general, catalytic activity depends on the heat-treatment temperature of the raw mixed powder in the production process and the firing temperature in the subsequent firing process and, as described above, can be improved by adjusting the $BaCO_3$ content within the predetermined range.

Among the organic material decomposition catalysts of sample Nos. 1 to 7 satisfying the first requirement of the present invention, the organic material decomposition catalysts of sample Nos. 1, 2, 4, and 5 with a peak intensity ratio $(BaCO_3(111))/I(BaZrO_3(110))$ in the range of 0.022 to 0.041 had a much higher toluene decomposition rate of 94.5% or more. Thus, an organic material decomposition catalyst satisfying the first requirement of the present invention preferably has a peak intensity ratio $I(BaCO_3(111))/I(BaZrO_3(110))$ in the range of 0.022 to 0.041. The organic material decomposition catalysts of sample Nos. 1, 2, 4, and 5 have a specific surface area in the range of 12.3 to 13.5 m²/g.

Among the organic material decomposition catalysts of sample Nos. 1 to 7 satisfying the second requirement of the present invention, the organic material decomposition catalysts of sample Nos. 1, 2, 4, and 5 with a specific surface area in the range of 12.3 to 13.5 $m^2/g$ had a much higher toluene decomposition rate of 94.5% or more. Thus, the organic material decomposition catalyst satisfying the second requirement of the present invention preferably has a specific surface area in the range of 12.3 to 13.5 $m^2/g$.

The present invention is not limited to these embodiments, and various applications and modifications can be made within the scope of the present invention.

Although an organic material decomposition catalyst according to the present invention is used to decompose toluene in the above description, the organic material is not limited to toluene.

Although the organic material decomposition catalysts were formed into pellets in the above embodiments, the organic material decomposition catalysts may have any form other than pellets. The organic material decomposition catalysts may have any shape, for example, a honeycomb shape.

REFERENCE SIGNS LIST 10 test apparatus
11 reactor
12 heater
13 controller
14 gas supply pipe
15 gas discharge pipe
16 toluene supply line
17 nitrogen supply line
18 oxygen supply line
19 sampling line

The invention claimed is:

1. An organic material decomposition catalyst, comprising:
   $BaCO_3$; and
   a perovskite composite oxide represented by $A_xB_yM_zO_w$, wherein A contains Ba, B contains Zr, and M denotes Mn,
   wherein a peak intensity $I(BaCO_3(111))$ of $BaCO_3(111)$ of the $BaCO_3$ and a peak intensity $I(BaZrO_3(110))$ of a perovskite composite oxide $A_xB_yM_zO_w(110)$ of the perovskite composite oxide represented by $A_xB_yM_zO_w$, each determined by X-ray diffractometry of the organic material decomposition catalyst, have a ratio $I(BaCO_3(111))/I(BaZrO_3(110))$ in a range of 0.022 to 0.052, and wherein
   $1.01 \leq x \leq 1.06$,
   $0.1 \leq z \leq 0.125$,
   $y+z=1$, and
   w denotes a positive value that satisfies electroneutrality.

2. The organic material decomposition catalyst according to claim 1, wherein the organic material decomposition catalyst has a specific surface area in a range of 12.3 to 16.9 $m^2/g$.

3. The organic material decomposition catalyst according to claim 2, wherein the ratio $I(BaCO_3(111))/I(BaZrO_3(110))$ ranges from 0.022 to 0.041.

4. The organic material decomposition catalyst according to claim 3, wherein the organic material decomposition catalyst has a specific surface area in the range of 12.3 to 13.5 $m^2/g$.

5. The organic material decomposition catalyst according to claim 1, wherein the ratio $I(BaCO_3(111))/I(BaZrO_3(110))$ ranges from 0.022 to 0.041.

6. The organic material decomposition catalyst according to claim 5, wherein the organic material decomposition catalyst has a specific surface area in the range of 12.3 to 13.5 $m^2/g$.

7. An organic material decomposition apparatus comprising the organic material decomposition catalyst according to claim 1.

8. An organic material decomposition catalyst, comprising:
   $BaCO_3$; and
   a perovskite composite oxide represented by $A_xB_yM_zO_w$, wherein
   A contains Ba,
   B contains Zr,
   M denotes Mn,
   $1.01 \leq x \leq 1.06$,
   $0.1 \leq z \leq 0.125$,
   $y+z=1$, and
   w denotes a positive value that satisfies electroneutrality, and
   the organic material decomposition catalyst has a specific surface area in a range of 12.3 to 16.9 $m^2/g$.

9. The organic material decomposition catalyst according to claim 8, wherein the specific surface area is in the range of 12.3 to 13.5 $m^2/g$.

10. An organic material decomposition apparatus comprising the organic material decomposition catalyst according to claim 8.

* * * * *